US008965740B2

(12) United States Patent
Safonov et al.

(10) Patent No.: US 8,965,740 B2
(45) Date of Patent: Feb. 24, 2015

(54) NUMERICAL METHOD OF CALCULATING HEAT, MASS, CHEMICAL AND ELECTRIC TRANSPORT FOR THREE-DIMENSIONAL POROUS SOLID

(75) Inventors: Sergey Sergeevich Safonov, Moscow (RU); Oleg Yurievich Dinariev, Moscow (RU); Nikolay Vyacheslavovich Evseev, Moscow (RU)

(73) Assignee: Schlumberger Technology Corporation, Sugar Land, TX (US)

( * ) Notice: Subject to any disclaimer, the term of this patent is extended or adjusted under 35 U.S.C. 154(b) by 491 days.

(21) Appl. No.: 13/381,442

(22) PCT Filed: Jun. 30, 2009

(86) PCT No.: PCT/RU2009/000322
§ 371 (c)(1),
(2), (4) Date: Feb. 22, 2012

(87) PCT Pub. No.: WO2011/002327
PCT Pub. Date: Jan. 6, 2011

(65) Prior Publication Data
US 2012/0150510 A1 Jun. 14, 2012

(51) Int. Cl.
*G06F 7/60* (2006.01)
*G06F 17/50* (2006.01)
(52) U.S. Cl.
CPC ........ *G06F 17/5018* (2013.01); *G06F 2217/16* (2013.01)
USPC .......................................................... 703/2
(58) Field of Classification Search
USPC .............................................................. 703/2
See application file for complete search history.

(56) References Cited

U.S. PATENT DOCUMENTS 6,516,080 B1 2/2003 Nur
6,826,520 B1 * 11/2004 Khan et al. ...................... 703/10
(Continued)

FOREIGN PATENT DOCUMENTS

RU 2242025 C1 12/2004
SU 1467475 A1 3/1989

OTHER PUBLICATIONS

Knackstedt et al. ("3D imaging and characterization of the pore space of carbonate core; implications to single and two phase flow properties", SPWLA 47th Annual Logging Symposium, Jun. 4-7, 2006).*
H.J. Vinegar ("X-Ray CT and NMR Imaging of Rocks", Journal of Petroleum Technology, Mar. 1986).*
(Continued)

*Primary Examiner* — Omar Fernandez Rivas
*Assistant Examiner* — Iftekhar Khan

(57) ABSTRACT

This invention relates to a method of estimating fluxes for the processes of matter and field transport through fluid-saturated or gas-saturated porous solid. The method comprises obtaining three-dimensional porous solid images by, but not limited, X-ray microtomography, 3D NMR imaging, 3D reconstruction from petrographic thin-section analysis etc., digital processing and morphological analysis of the 3D core images by consecutive application of the image filtering, segmentation and multiple property recognition for obtaining digital 3D models of porous solid samples and performing a set of morphological and geometrical statistical property analysis. For the above mentioned 3D model (models) heat, mass, chemical and electric fluxes are modeled (separately or in combination) under given boundary conditions by means of numerical solver. The new models, which are statistically equivalent to the abovementioned model (models) are generated by means of random field and stochastic geometry theory; heat, mass, chemical and electric fluxes are simulated for new models. The obtained fluxes are averaged over realizations to be used in macroscopic calculations.

6 Claims, 3 Drawing Sheets

(56) References Cited

U.S. PATENT DOCUMENTS

| | | | |
|---|---|---|---|
| 7,284,448 B2* | 10/2007 | Klammler et al. | 73/861.04 |
| 8,044,350 B2* | 10/2011 | Chen et al. | 250/293 |
| 8,630,831 B2* | 1/2014 | Bratvedt et al. | 703/10 |
| 8,676,556 B2* | 3/2014 | Deffenbaugh et al. | 703/10 |
| 2008/0192987 A1 | 8/2008 | Helgason et al. | |
| 2009/0259446 A1* | 10/2009 | Zhang et al. | 703/2 |
| 2011/0004447 A1* | 1/2011 | Hurley et al. | 703/1 |

OTHER PUBLICATIONS

Acharya et al. ("Magnetic Field Effects on the Free Convection Andmass Transfer Flow Through Porous Medium With Constant Suction and Constant Heat Flux", Indian 1. pure appl. Math., 31(1) 1-18).*

Boyarinov, et al., "Optimization Methods in Chemical Technologies", Second Edition, Chemistry Publishing House: Moscow, 1975, p. 25.

* cited by examiner

NUMERICAL METHOD OF CALCULATING HEAT, MASS, CHEMICAL AND ELECTRIC TRANSPORT FOR THREE-DIMENSIONAL POROUS SOLID

FIELD OF THE INVENTION

This invention relates to a method of estimating fluxes for the processes of matter and field transport through fluid-saturated or gas-saturated porous solid. In particular, the invention relates to the calculating of heat, mass, chemical and electric transport for the three-dimensional porous media.

BACKGROUND ART

Macroscopic description of porous media is based on two basic assumptions: continuous medium approximation, which disregards microscopic structure of the material and assumes continuous distribution of the matter in space, and phenomenological response coefficient approximation, which disregards internal degrees of freedom of the material and assumes that the material responds to the external force (temperature or pressure gradient, electric potential, etc.) as an unstructured entity with certain response coefficient (thermal conductivity, permeability, electric conductivity, etc.)

Since macroscopic modeling is a primary tool in many industrial and scientific applications, the microscopic modeling is often considered an auxiliary tool for estimating the macroscopic response coefficients.

Yet there is a lot of experimental data indicating that the macroscopic models are insufficient.

For the first example, one-phase macroscopic fluid transport model is based on permeability coefficient. It is well known, that a rather extensive set of one-phase transport phenomena lies outside the permeability coefficient concept (thermocapillary, osmotic, Graham, Klinkenberg and other effects).

For the second example, multiphase fluid transport model is based on phase permeability coefficients. Many observed transport phenomena indicate, that this approach is insufficient and microscopic processes are important (hysteresis of phase permeabilities, cross-term effects, film lubrication effects, capillary number influence, etc.).

U.S. Pat. No. 6,516,080 describes a numerical method of estimating a desired physical property of a three-dimensional porous medium, said desired physical property being selected from the group consisting of fluid flow properties, electrical properties, elastic properties, permeability, electrical conductivity, and elastic wave velocity. According to this method a three-dimensional model is reconstructed from experimental two-dimensional images by statistical means; properties are calculated using a numerical solver of Navier-Stokes equations, or a Lattice-Boltzmann flow simulator, or any finite element numerical solver.

The limitations of this patent are following: patent is focused on acquisition of macroscopic properties without validation of these properties; possible multiphase and thermal effects are not mentioned; possible non-newtonian rheology of fluids is not mentioned; possible phase transitions fluid-fluid (like gas-condensate) and fluid-solid (like wax deposition from oil, salt deposition from water solution) are not mentioned; possible surfactant effects (like change of wettability or interfacial tension) are not mentioned; possible geochemical effects (like clay imbibition) are not mentioned; possible chemical reactions are not mentioned.

These examples demonstrate that there are many phenomena, which significantly influence transport through saturated porous solid; and one cannot apriori be sure that under realistic conditions the considered material can be adequately described by some standard macroscopic continuous medium model. The microscopic model can provide a lot of information outside macroscopic description. It can either validate the macroscopic model, or show its limitations, or even show its inapplicability.

The modern computation facilities provide the possibility to use micromodels of porous solids directly for the calculation of heat, mass, chemical and electric fluxes under given external conditions. This data can be generalized by statistical means for the large-scale transport modeling.

SUMMARY OF THE INVENTION

The invention provides a method for calculating heat, mass, chemical and electric transport for the three-dimensional porous medium. The method comprises obtaining three-dimensional porous solid images by, but not limited, X-ray microtomography, 3D NMR imaging, 3D reconstruction from petrographic thin-section analysis etc., digital processing and morphological analysis of the 3D core images by consecutive application of the image filtering, segmentation and multiple property recognition for obtaining digital 3D models of porous solid samples and performing a set of morphological and geometrical statistical property analysis, for the above mentioned 3D model (models) heat, mass, chemical and electric fluxes are modeled (separately or in combination) under given boundary conditions by means of numerical solver, which is based on statistical many-body problem approach and which takes into account the functional expression for the entropy or for the Helmholtz energy of the system. The modeling covers (separately or in combination) thermophysical, chemical and electromagnetic phenomena, one-phase saturation or multiphase saturation with or without phase transitions, with or without chemical interaction with solid itself, with newtonian or non-newtonian rheology, with or without surfactants, with homogeneous or heterogeneous wettability, with or without chemical reactions, for pure substances or for multicomponent mixtures; the new models, which are statistically equivalent to the abovementioned model (models) are generated by means of random field and stochastic geometry theory; heat, mass, chemical and electric fluxes are simulated for new models; the obtained fluxes are averaged over realizations to be used in macroscopic calculations; the applicability of the existing macroscopic models in respect to the obtained fluxes can be checked and upon a positive result the respective macroscopic coefficients can be then evaluated. However, in the case of the negative result the dependence of the fluxes on the boundary conditions is to be used directly.

DESCRIPTION OF THE PREFERRED EMBODIMENT OF THE INVENTION

The following preferred embodiment of the invention is set forth without imposing limitations upon the claimed invention.

Figure 1A:
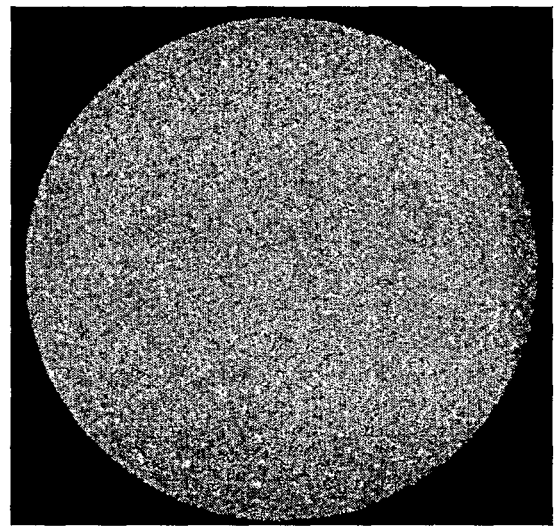
FIG. 1A is a schematic representation of a single 2D slice of 3D X-ray microtomoghaphy image of a porous solid sample.
Figure 1B:
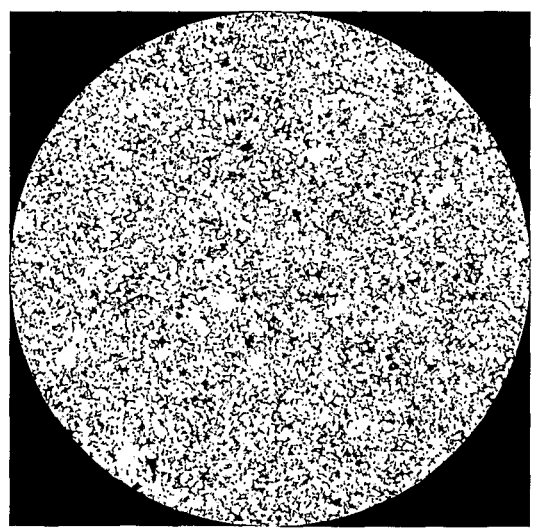
FIG. 1B is a schematic binary index image view of FIG. 1A after pore space and rock recognition.

In an embodiment of the present invention a 3D X-ray microtomography image of a porous solid sample is obtained (see FIG. 1A). Then, a processing of microtomography image is performed, which helps to recognize pores and grains with different mineralogical composition. The results of pore space and rock recognition are presented at FIG. 1B.

Figure 2:
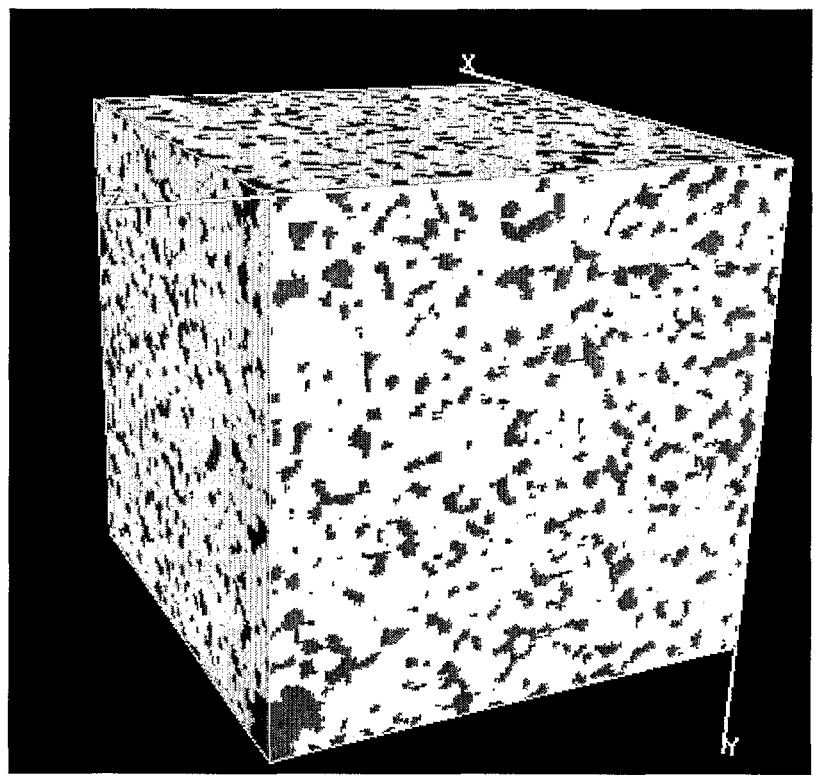
FIG. 2 is a schematic view of a 3D model demonstrating the spatial distribution of rock (white) and voids (black).

Statistical properties of 3D model constructed at the previous step are being analyzed. This can help to generate 3D objects, which are statistically identical to the parts of initial 3D model (see example at FIG. 2).

Then, the transport of oil-water mixture through 3D model is simulated. Two cases can be considered. In case 1 both fluids are newtonian. In case 2 water is Newtonian, while oil is non-newtonian. It is important to stress, that in case 2 phase permeability for oil is nonexistent, because oil viscosity cannot be defined.

The simulations were carried out for the following numerical values of different parameters:

Properties of Fluids

Case 1

Water has newtonian rheology, hydrocarbon fluid has newtonian rheology.
Water: $\rho_w=1000$ kg/m$^3$, $m_w=18$ kg/m$^3$, $\mu_{sw}=0.001$ Pa·s, $\mu_{vw}=0.1$ Pa·s
Hydrocarbon fluid: $\rho_h=800$ kg/m$^3$, $m_h=100$ kg/m$^3$, $\mu_{vw}=0.1$ Pa·s
Water-Hydrocarbon fluid interfacial surface tension: $\sigma_{wh}=0.022$ N/m

Case 2

Water has newtonian rheology, hydrocarbon fluid has non-newtonian rheology, namely hydrocarbon fluid is shear thickening, also known as dilatant. In this case one cannot define macroscopic phase permeabilities.
Water: $\rho_w=1000$ kg/m$^3$, $m_w=18$ kg/m$^3$, $\mu_{sw}=0.001$ Pa·s, $\mu_{vw}=0.1$ Pa·s
Hydrocarbon fluid: $\rho_h=800$ kg/m$^3$, $m_h=100$ kg/m$^3$, $k_h=0.003$ Pa·s$^n$, $n_h=1.1$
Water-Hydrocarbon fluid interfacial surface tension: $\sigma_{wh}=0.022$ N/m
where
$\rho_w$—water mass density
$\rho_h$—hydrocarbon fluid mass density
$m_w$—water molar mass
$m_h$—hydrocarbon fluid molar mass
$\mu_{sw}$, $\mu_{vw}$—water shear and volume viscosities respectively
$\mu_{sh}$, $\mu_{vh}$—hydrocarbon fluid shear and volume viscosities respectively
$k_h$, Pa·s$^n$—hydrocarbon fluid consistency index
$n_h$—hydrocarbon fluid consistency power

Properties of Porous Solid

Rock is water wet homogeneously, contact angle is 25°.

Boundary Conditions

The fluids flow is driven by macroscopic pressure gradient equal to 50 bar/m.

Figure 3:
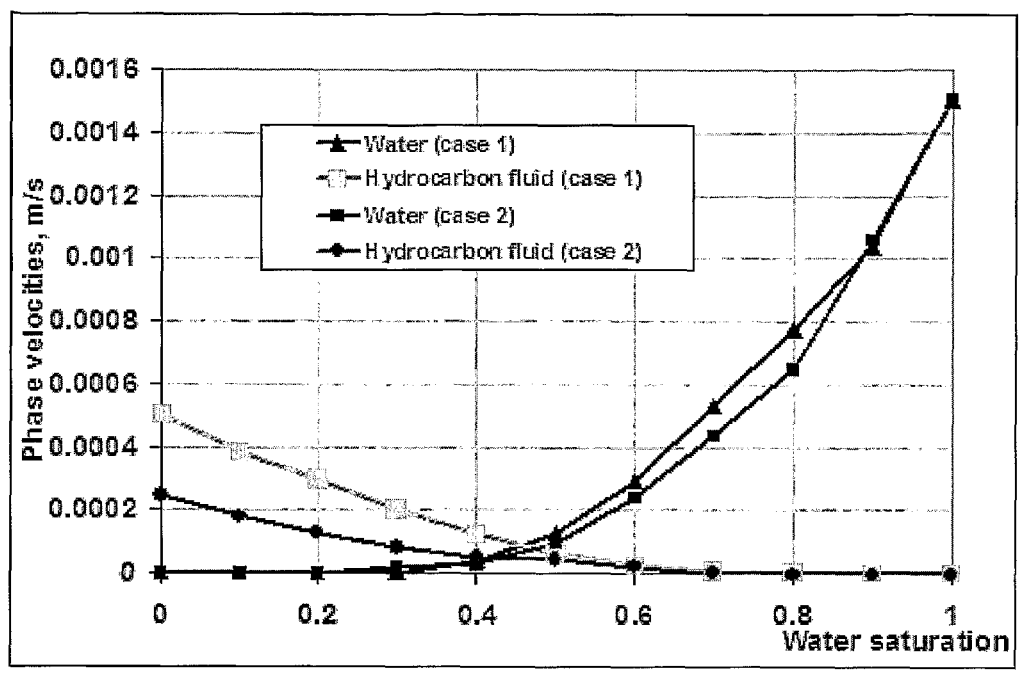
FIG. 3 is a graphic representation showing phase velocities of water and hydrocarbon fluid as functions of water saturation, pressure gradient equal to 50 bar/m.

The fluxes, which are obtained at the previous step, are averaged over the generated 3D micromodels. The results are presented at FIG. 3.

The invention claimed is:

1. Numerical method for calculating heat, mass, chemical and electric fluxes through a saturated porous medium comprising:
    obtaining three-dimensional images of porous solid samples of said saturated porous medium;
    digital processing and morphological analysis of said 3D images;
    obtaining digital 3D models of the samples and performing a set of morphological and geometrical statistical property analysis;
    modeling, separately or in combination, heat, chemical and electric fluxes or combination of at least one of the heat, chemical and electric fluxes with mass fluxes for said 3D models under given boundary conditions, said modeling is made by means of a numerical solver, which is based on statistical many-body problem approach and which takes into account a functional expression for an entropy or for a Helmholtz energy,
    generating new models, statistically equivalent to said 3D models of the sample by means of random field and stochastic geometry theory and simulating heat, mass, chemical and electric fluxes for said new models.

2. Numerical method of claim 1, wherein the three-dimensional images are obtained by X-ray microtomography.

3. Numerical method of claim 1, wherein the three-dimensional images are obtained by 3D NMR imaging.

4. Numerical method of claim 1, wherein the three-dimensional images are obtained by 3D reconstruction from petrographic thin-section analysis.

5. Numerical method of claim 1, wherein said heat, mass, chemical and electric fluxes modeling covers thermophysical, chemical and electromagnetic phenomena, one-phase saturation or multiphase saturation with or without phase transitions, with or without chemical interaction with solid itself, with newtonian or non-newtonian rheology, with or without surfactants, with homogeneous or heterogeneous wettability, with or without chemical reactions, for pure substances or for multicomponent mixtures.

6. Numerical method of claim 1, wherein digital processing and morphological analysis of said 3D images are made by consecutive application of image filtering, segmentation and multiple property recognition.

* * * * *